United States Patent [19]

Olby

[11] Patent Number: 4,806,507

[45] Date of Patent: Feb. 21, 1989

[54] METHOD OF PREVENTING GLAZE DEFECTS

[75] Inventor: John K. Olby, Wembley, United Kingdom

[73] Assignee: Cookson Group PLC, London, England

[21] Appl. No.: 97,201

[22] Filed: Sep. 16, 1987

[30] Foreign Application Priority Data

Sep. 19, 1986 [GB] United Kingdom ............... 8622569
Dec. 22, 1986 [GB] United Kingdom ............... 8630585

[51] Int. Cl.$^4$ .............................................. C03C 8/14
[52] U.S. Cl. ........................................ 501/17; 501/14; 501/18; 106/450; 106/452
[58] Field of Search ............... 501/14, 15, 16, 17, 501/18; 106/308 B, 299, 450, 452, 482

[56] References Cited

U.S. PATENT DOCUMENTS

| | | | |
|---|---|---|---|
| 3,802,900 | 4/1974 | Broll et al. | 106/299 |
| 3,847,639 | 11/1974 | Broll et al. | 106/299 |
| 4,008,091 | 2/1977 | Wagner et al. | 501/16 |
| 4,482,390 | 11/1984 | Airey et al. | 501/17 |

FOREIGN PATENT DOCUMENTS 2183824 12/1973 France.

OTHER PUBLICATIONS

Sprechsaal vol. 118, No. 10, Oct. 1985, pp. 962–964, 966 and 967.
Chemical Abstracts, vol. 99, No. 8, Aug. 11, 1983, p. 242, Abstract 57806r.

Primary Examiner—William R. Dixon, Jr.
Assistant Examiner—Anthony J. Green
Attorney, Agent, or Firm—Kenyon & Kenyon

[57] ABSTRACT

A method of preventing glaze defects occurring when using pigments which are provided by inclusion in zirconium silicate (zircon) comprises the incorporation into the glaze composition of an additive which is zirconium oxide, zirconium silicate, arsenic trioxide, antimony trioxide, ceric oxide, or a mixture thereof, or a precursor therefor in an amount sufficient to reduce or prevent glaze defects.

15 Claims, No Drawings

METHOD OF PREVENTING GLAZE DEFECTS

The present invention relates to a method of preventing glaze defects occurring when using pigments which are protected by inclusion in zirconium silicate (zircon).

It is known to protect pigment for ceramic applications by encapsulating a sulphide or a sulphide/selenide pigment in zirconium silicate. Examples of such protected pigments are zirconium silicate/cadmium sulphide yellow, zirconium silicate/cadmium sulphide/selenide orange and red, zirconium silicate/vanadium sulphide grey and zirconium silicate/molybdenum sulphide grey/green. The more intensely coloured forms of these pigments suffer from the defect that, when they are used at high loadings in a transparent glaze they produce a glaze surface similar to that of orange peel. Where the interaction of the pigment and the glaze is more serious, blistering occurs. Generally, the higher melting glazes, such as sanitary glazes, show the orange peel effect and the lower melting glazes such as tile glazes, the blistering fault.

We have now found that these defects can be overcome by incorporating into the composition a small proportion of certain additives.

Accordingly, the present invention provides a method of preventing glaze defects in a composition comprising a glaze and a sulphide or sulphide/selenide pigment which is protected by the inclusion of the pigment in zirconium silicate, which method comprises:

(i) when the glaze is a sanitary glaze or a tile glaze incorporating into the composition an additive selected from zirconium oxide having a primary particle size of up to 0.3 micrometers or zirconium silicate, or a mixture thereof or a precusor therefor in an amount effective to reduce or prevent glaze defects;

(ii) when the glaze is a tile glaze incorporating into the composition arsenic trioxide or a precursor therefor in an amount effective to reduce or prevent glaze defects;

(iii) when the glaze is a tile glaze and the pigment is a zirconium silicate/cadmium sulphide or zirconium silicate/cadmium sulphide/selenide pigment incorporating into the composition antimony trioxide or ceric oxide or a mixture thereof or a precursor therefor in an amount effective to reduce or prevent glaze defects.

It will be appreciated that any precursor which breaks down on firing to give the desired additive may be used in the invention. For example, hydrated ceric oxide breaks down to ceric oxide on firing, antimony pentoxide breaks down to antimony trioxide on firing and carbonated hydrous zirconia breaks down to zirconia on firing.

Preferably the zirconium oxide used is prepared from zircon by a process giving a finely divided product. This may then be milled, if required, to break down any agglomerates. It is preferred that the zirconium oxide used in the present invention has a primary particle size of 0.1 micrometers.

Preferably, the zirconium oxide is added to a mixture of the protected pigment and glaze prior to milling so that any agglomerates of the zirconium oxide particles are broken down and dispersed through the mixture. The zirconium oxide is used in an amount of at least 1% by weight of the glaze and when the glaze is a sanitary glaze the zirconium oxide is preferably used in an amount in the range of from 1 to 2% by weight of the glaze, most preferably 2% by weight. The molecular formula of a transparent sanitary glaze is as follows:

| KNaO | CaO | ZnO | Al$_2$O$_3$ | SiO$_2$ | MgO | BaO |
|---|---|---|---|---|---|---|
| 0.175 | 0.325 | 0.20 | 0.30 | 3.00 | 0.20 | 0.10 |

When the glaze is a tile glaze the zirconium oxide is preferably used in an amount in the range of from 1 to 3% by weight of the glaze, most preferably 3% by weight. The molecular formula of a transparent tile glaze is as follows:

| K$_2$O | Na$_2$O | CaO | Al$_2$O$_3$ | B$_2$O$_3$ | SiO$_2$ |
|---|---|---|---|---|---|
| 0.24 | 0.16 | 0.60 | 0.55 | 0.94 | 3.41 |

Preferably the zirconium silicate is in finely divided form, at least 50% of the zirconium silicate having a primary particle size of less than 1.0 micrometers, more preferably a primary particle size of less than 0.5 micrometers.

Preferably, the zirconium silicate is added to a mixture of the protected pigment and glaze prior to milling so that any agglomerates of the zirconium silicate particles are broken down and dispersed through the mixture.

When the glaze is a sanitary glaze the zirconium silicate is preferably used in an amount in the range of from 1.5 to 3% by weight of the glaze, most preferably 3% by weight.

When the glaze is a tile glaze the zirconium silicate is preferably used in an amount in the range of from 1 to 4.5% by weight of the glaze, most preferably 4.5% by weight.

It will be appreciated that if too much zirconium oxide or zirconium silicate is added to a transparent glaze composition then opacification will occur which is not desirable.

The protected pigment which is incorporated into the composition may be any sulphide or sulphide/selenide encapsulated in zirconium silicate, such as, zirconium silicate/cadmium sulphide yellow, zirconium silicate/cadmium sulphide/selenide orange, zirconium silicate/cadmium sulphide/selenide red, zirconium silicate/vanadium sulphide grey or zirconium silicate/molybdenum sulphide grey/green, except when antimony oxide or ceric oxide are used as additives in tile glazes when the pigment is a zirconium silicate/cadmium sulphide or zirconium silicate/cadmium sulphide/selenide pigment.

Whilst not wishing to be bound by theory, it is thought that the glaze faults which occur in the absence of the additive are due to some of the pigment becoming dissolved in the glaze, thus releasing sulphide and selenide into the glaze. Where a considerable amount of the pigment dissolves in the glaze gases are evolved from the maturing glaze which produces blistering. Where less pigment dissolves in the glaze the sulphide or sulphide/selenide released merely prevents the glaze from maturing properly and results in the surface of the glaze having the appearance of an orange peel. When finely divided zirconium oxide or zirconium silicate is present this is thought to dissolve in preference to the pigment, which typically has a primary particle size in range of from 0.5 to 1.0 micrometers. The glaze therefor becomes saturated with the zirconium oxide without dissolving an appreciable proportion of the pigment. The glaze is thus able to mature properly in the absence of the surface defects discussed above.

A similar improvement in glaze surfaces in tile glazes can be obtained for any sulphide or sulphide/selenide pigment with arsenic trioxide, or for a zirconium silicate/cadmium sulphide or zirconium silicate/cadmium sulphide/selenide pigment with small additions of antimony trioxide, ceric oxide or a precursor therefor. These additives, particularly when incorporated into lead-containing glazes, result in unusually clean and bright colours being obtained. The optimum proportions of these additives are as follows:

antimony trioxide from 0.5 to 6% by weight, preferably 1.0 to 3% by weight;

arsenic trioxide from 0.5 to 4% by weight, preferably 1.0 to 3% by weight; and ceric oxide from 1.0 to 5% by weight, preferably 1.5 to 3% by weight.

The particle size of these oxides does not appear to be as important as the particle size of the zirconium oxide or zirconium silicate. Thus arsenic trioxide with a particle size in excess of 10 micrometers has been successfully used. It is preferred, however, that the oxide additives should be preground.

The antimony trioxide, arsenic trioxide and ceric oxides are particularly effective in the lower melting glazes such as tile glazes. It is thought that they act by accelerating the clearance of bubbles from the glaze. Arsenic trioxide and ceric oxide have a lesser beneficial effect in higher melting glazes such as sanitary glazes. Antimony trioxide produces blistering in these higher melting glazes.

The additives which are used in the method of the invention may be used as a mixture of two or more thereof. For example, zirconium oxide or zirconium silicate may be admixed with antimony oxide, arsenic oxide or ceric oxide. For example zirconium oxide may be included in a glaze or an amount of about 3% by weight based on the weight of the glaze and antimony oxide included in a glaze in an amount of about 1.5% by weight based on the weight of the glaze.

The present invention includes within its scope a sanitary or tile glaze composition which comprises a sanitary or tile glaze, a sulphide or sulphide/selenide pigment which is protected by the inclusion of the pigment in zirconium silicate and an additive selected from zirconium oxide having a primary particle size of up to 0.3 micrometers, zirconium silicate, or a mixture thereof or a precursor therefor in an amount effective to reduce or prevent glaze defects.

The present invention furthermore includes within its scope a tile glaze composition which comprises a tile glaze, a sulphide or sulphide/selenide pigment which is protected by the inclusion of the pigment in zirconium silicate and an additive which is arsenic trioxide or a precursor therefor in an amount sufficient to reduce or prevent glaze defects. The present invention additionally includes within its scope a tile glaze composition which comprises a tile glaze, a zirconium silicate/cadmium sulphide or zirconium silicate cadmium sulphide/selenide pigment and an additive which is antimony trioxide or ceric oxide or a mixture thereof or a precursor therefor in an amount effective to reduce or prevent glaze defects.

The preferred features of the compositions of the invention are as described hereinbefore in respect of the method of the invention.

The present invention also includes within its scope a sanitary article which has a glaze surface formed by coating the article with a glaze compostion as hereinbefore described and firing the glaze composition.

The present invention further includes within its scope a tile which has a glaze surface formed by coating the tile with a glaze composition as hereinbefore described and firing the glaze composition.

The present invention will be further described with reference to the following Examples.

EXAMPLE 1

5 g of an intense zirconium silicate/cadmium sulphide/selenide stain, 1 g of finely divided zirconium oxide (primary particle size 0.1 micrometers), 50 g of a transparent sanitary glaze and 40 ml water were milled together in a 1 pint ball mill for 20 minutes. The resulting glaze slip was sprayed onto a cast sanitary slab (3"×4") to give a wet weight increase of 14 g. The sprayed slab was fired at a rate of increase in temperature of 100° C. per hour to 1200° C., maintained for 2 hours at 1200° C. and then allowed to cool in the furnace. The fired glaze had a bright orange red colour and a good glaze surface. A similar glaze trial prepared without the addition of the finely divided zirconium oxide had an inferior surface showing a defect similar in appearance to the surface of orange peel.

EXAMPLE 2

5 g of an intense zirconium silicate/vanadium sulphide grey stain, 1.5 g of finely divided zirconium oxide (primary particle size 0.1 micrometers), 50 g of a transparent tile glaze and 40 ml water were milled together as described in Example 1. The resulting glaze slip was sprayed onto a biscuit tile (3"×6") to give a wet weight increase of 14 g. The sprayed tile was fired at a rate of increase of temperature of 100° C. per hour to 1060° C., maintained for 1 hour at 1060° C. and then allowed to cool in the furnace. The fired glaze had a deep grey colour and a good surface. A similar glaze trial prepared without the addition of the finely divided zirconium oxide had a badly blistered surface.

EXAMPLE 3

5 g of an intense zirconium silicate/cadmium sulphide/selenide stain, 1.5 g of finely divided zirconium silicate (50% less than 1 micrometers primary particle size), 50 g of a transparent sanitary glaze and 40 ml water were milled together in a 1 pint ball mill for 20 minutes. The resulting glaze slip was sprayed onto a cast sanitary slab (3"×4") to give a wet weight increase of 14 g. The sprayed slab was fired at a rate of increase in temperature of 100° C. per hour to 1200° C., maintained for 2 hours at 1200° C. and then allowed to cool in the furnace. The fired glaze had a bright orange red colour and a good glaze surface. A similar glaze trial prepared without the addition of the finely divided zircon had an inferior surface showing a defect similar in appearance to the surface of orange peel.

EXAMPLE 4

5 g of an intense zirconium silicate/cadmium sulphide/selenide stain, 1.5 g of finely divided zirconium oxide (primary particle size 0.1 micrometers), 50 g of a lead borosilicate clear tile glaze and 40 ml water were milled together in a 1 pint mill for 20 minutes. The resulting glaze slip was sprayed on a biscuit tile (3"×6") to give a wet weight increase of 14 g. The sprayed tile was fired at a rate of increase of temperature of 100° C. per hour to 1060° C., maintained for 1 hour at 1060° C. and then allowed to cool in the furnace. The fired glaze had a bright orange red colour and a good surface. A similar glaze trial prepared without the addition of the finely divided zirconium oxide had a badly blistered surface.

EXAMPLE 5

5 g of an intense zirconium silicate/cadmium sulphide/selenide stain, 1.5 g of finely divided zirconium oxide (primary particle size 0.1 micrometers), 50 g of a lead borosilicate clear tile glaze and 40 ml water were milled together in a 1 pint ball mill for 20 minutes. The resulting glaze slip was sprayed onto a biscuit tile and fired at a rate of increase of temperature of 100° C. per hour to 1060° C., maintained for 1 hour at 1060° C. and then allowed to cool in the furnace. The fired glaze had a bright orange red colour and a good surface. A similar glaze trial prepared without the addition of finely divided zirconium silicate had a badly blistered surface.

EXAMPLE 6

(Comparative)

5 g of an intense zirconium silicate/cadmium sulphide/selenide stain, 1.5 g ground zircon (50% less than 10 micrometers primary particle size), 50 g of a transparent sanitary glaze and 40 ml water were milled together in a 1 pint ball mill for 20 minutes.

The resulting glaze slip was sprayed onto a cast sanitary slab (3"×4") to give a wet increase of 14 g. The sprayed slab was fired at a rate of increase in temperature of 100° C. per hour to 1200° C., maintained for 2 hours at 1200° C. and then allowed to cool in the furnace. The fired glaze had a blistered surface. A similar glaze trial without the addition of the ground zircon had a severely blistered surface.

EXAMPLE 7

5 g of an intense zirconium silicate/cadmium sulphide/selenide stain, 0.75 g antimony trioxide, 50 g of a lead borosilicate clear tile glaze and 40 ml water were milled together in a 1 pint ball mill for 20 minutes. The resulting glaze slip was sprayed onto a biscuit tile (3"×3") to give a wet weight increase of 7 g. The sprayed tile was fired at a rate of increase of temperature of 100° C. per hour to 1060° C., maintained for 1 hour at 1060° C. and then allowed to cool in the furnace. The fired glaze had a good surface and was of a bright and clean red colour. A similar glaze trial prepared without the addition of antimony trioxide had a badly blistered surface and a brown toned red colour.

EXAMPLE 8

A tile was sprayed with glaze slip and fired as in Example 7 but with the substitution of 0.5 g arsenic trioxide for the antimony trioxide in the glaze slip formulation. The resulting glaze had a good surface and was of a bright and clean red colour.

EXAMPLE 9

5 g of an intense zirconium silicate/cadmium sulphide/selenide stain, 1.5 g ceric oxide (99.9% CeO$_2$), 50 g of a leadless clear tile glaze and 40 ml water were milled together in a 1 pint ball mill for 20 minutes. The resulting glaze slip was sprayed on to a biscuit tile and fired as in Example 7. The fired glaze had a good surface and a clean red colour although it lacked the brightness of the fired glazes of Examples 7 and 8.

EXAMPLE 10

A tile was sprayed with glaze slip and fired as in Example 7 using the same lead borosilicate clear tile glaze but with the substitution of 0.75 g technical grade ceric oxide (approximately 50% CeO$_2$, remainder other rare earths) for the antimony trioxide. The resulting glaze had a good surface and was of a bright and clean red colour.

EXAMPLE 11

A tile was sprayed with glaze slip and fired as in Example 7 but reducing the proportion of antimony oxide to 0.25 g. The fired glaze had a good surface and was of a bright and clean red colour. A similar glaze trial prepared with only 0.1 g antimony oxide had a blistered surface.

EXAMPLE 12

A tile was sprayed with glaze slip and fired as in Example 7 but substituting 0.25 g arsenic oxide for the antimony oxide. The fired trial had a good surface and was of a bright red colour. A similar glaze trial prepared without the addition of arsenic oxide had a blistered surface.

EXAMPLE 13

5 g of an intense zirconium silicate/molybdenum sulphide grey green stain, 0.5 g arsenic oxide, 50 g of a lead borosilicate clear tile glaze and 40 ml water were milled together in a 1 pint ball mill for 20 minutes. The resulting glaze slip was sprayed onto a biscuit tile (3"×3") to give a wet weight increase of 7 g. The sprayed tile was fired at a rate of increase of temperature of 100° C./hour to 1060° C., maintained for 1 hour at 1060° C. and then allowed to cool in the furnace. The fired glaze had a good surface and was of a deep grey green colour. A similar trial prepared without the addition of arsenic oxide had a blistered surface.

EXAMPLE 14

A tile was sprayed with glaze slip and fired as in Example 13 substituting an intense zirconium silicate/vanadium sulphide grey stain. The fired tile had a good surface and was of a deep grey colour. A similar glaze trial prepared without the addition of arsenic oxide had a blistered surface.

EXAMPLE 15

Reflectance measurements were carried out on some of the glaze trials of an intense zircon/cadmium sulphide/selenide stain to show the effect of antimony trioxide and ceric oxide on glaze colour. In each case the stain proportion was 10% of the glaze by weight and a lead borosilicate tile glaze was used.

TABLE 1

| Dopant % by weight | Surface Appearance | Reflectance | | | | |
| --- | --- | --- | --- | --- | --- | --- |
| | | L | A | B | C | H |
| nil | badly blistered | 39.61 | 31.08 | 17.66 | 35.74 | 29.61 |
| 1.5% Sb$_2$O$_3$ | good | 48.62 | 47.53 | 24.34 | 53.40 | 27.11 |
| 5% Sb$_2$O$_3$ | good | 49.92 | 45.65 | 21.21 | 50.33 | 24.92 |
| 1.5% CeO$_2$ | good | 46.63 | 50.12 | 28.91 | 57.86 | 29.98 |

TABLE 1-continued

| Dopant % by weight | Surface Appearance | Reflectance | | | | |
|---|---|---|---|---|---|---|
| | | L | A | B | C | H |
| 5% CeO$_2$ | good | 51.88 | 43.27 | 23.53 | 49.26 | 28.54 |

In this table the columns have the following significance:-
L lightness
A redness
B yellowness
C chroma
H hue
A lower H value indicates a truer less orange toned red, a higher C value greater strength and purity of colour.

EXAMPLE 16

Reflectance measurements were made on similar glaze trials on those of Example 15 using two stains giving particularly intense but slightly brownish colours in glaze. These stains had been prepared by a simplified process which is the subject of our co-pending Application No. (BWT Case No. 29343/008). The results are given in Table 2. The comparative cleanness and red tone of the glaze colours obtained when the antimony oxide was added is evidenced by the drop in the H values and the increase in the C values effected by this addition.

TABLE 2

| Stain | Dopant % by weight | Surface Appearance | Reflectances | | | | |
|---|---|---|---|---|---|---|---|
| | | | L | A | B | C | H |
| A | — | Blistered | 41.70 | 34.08 | 18.24 | 38.65 | 28.16 |
| A | 1.5% Sb$_2$O$_3$ | good | 44.51 | 43.58 | 22.12 | 48.88 | 26.91 |
| B | — | Blistered | 40.48 | 27.07 | 15.99 | 31.44 | 30.58 |
| B | 1.5% Sb$_2$O$_3$ | good | 47.46 | 39.84 | 19.04 | 44.15 | 25.55 |

In this Table the columns have the same significance as that given in Table 1.

I claim:

1. A method of preventing glaze defects in a composition consisting essentially of a glaze and a sulphide or sulphide/selenide pigment which is protected by the inclusion of the pigment in zirconium silicate, which method is chosen from the group consisting of
   (i) when the glaze is a sanitary glaze or a tile glaze incorporating into the composition an additive which is selected from the group consisting of particles of zirconium oxide, the particles having a primary particle size of up to 0.3 micrometers or zirconium silicate, or a mixture thereof or precursors therefor in an amount effective to reduce or prevent glaze defects; or
   (ii) when the glaze is a tile glaze incorporating into the composition an additive which is selected from the group consisting of arsenic trioxide and precursors therefor in an amount effective to reduce or prevent glaze defects; or
   (iii) when the glaze is a tile glaze and the pigment is selected from the group consisting of a zirconium silicate/cadmium sulphide and a zirconium silicate/cadmium sulphide/selenide pigment incorporating into the composition an additive which is selected from the group consisting of antimony trioxide, ceric oxide, a mixture thereof and precursors therefor in an amount effective to reduce or prevent glaze defects.

2. Method according to claim 1 wherein the zirconium oxide has a primary particle size of 0.1 micrometers.

3. Method according to claim 1 wherein the glaze is a transparent sanitary glaze and the zirconium oxide is added in an amount of from 1 to 2% by weight of the glaze.

4. Method according to claim 1 wherein the glaze is a transparent tile glaze and the zirconium oxide is added in an amount of from 1 to 3% by weight of the glaze.

5. Method according to claim 1 wherein the additive is zirconium silicate in finely divided form, at least 50% of the zirconium silicate having a primary particle size of less than 1.0 micrometers.

6. Method according to claim 5 wherein the glaze is a transparent sanitary glaze and the additive is zirconium silicate which is added in an amount of from 1.5 to 3% by weight of the glaze.

7. Method according to claim 5 wherein the glaze is a transparent tile glaze and the additive is zirconium silicate which is added in an amount of from 1 to 4.5% by weight of the glaze.

8. Method according to claim 1 wherein the arsenic trioxide in option (ii) is added in an amount of from 0.5 to 4% by weight of the glaze.

9. Method according to claim 1 wherein the additive in option (iii) is antimony trioxide which is added in an amount of from 0.5 to 6% by weight of the glaze.

10. Method according to claim 1 wherein the additive in option (iii) is ceric oxide which is added in an amount of from 1.0 to 5% by weight of the glaze.

11. Method according to any one of claims 1–10 wherein the protected pigment is selected from the group consisting of zirconium silicate/cadmium sulphide yellow, zirconium silicate/cadmium sulphide/selenide orange, zirconium silicate/cadmium sulphide/selenide red, zirconium silicate/vanadium sulphide grey and zirconium silicate/molybdenum sulphide grey/green.

12. A glaze composition which comprises a glaze, a sulphide or sulphide/selenide pigment which is protected by the inclusion of the pigment in zirconium silicate and an additive selected from the group consisting of zirconium oxide having a primary particle size of up to 0.3 micrometers, zirconium silicate, a mixture thereof and precursors therefor in an amount effective to reduce or prevent glaze defects.

13. A tile glaze composition which comprises a tile glaze, a sulphide or sulphide/selenide pigment which is protected by the inclusion of the pigment in zirconium silicate and an additive selected from the group consisting of arsenic trioxide and precursors therefor in an amount sufficient to reduce or prevent glaze defects.

14. Composition according to claim 12 or claim 13 wherein the protected pigment is selected from the group consisting of zirconium silicate/cadmium sulphide yellow, zirconium silicate/cadmium sulphide/selenide orange, zirconium silicate/cadmium sulphide/selenide red, zirconium silicate/vanadium sulphide grey and zirconium silicate/molybdenum sulphide grey/green.

15. A tile glaze composition which comprises a tile glaze, a pigment selected from the group consisting of a zirconium silicate/cadmium sulphide and a zirconium silicate cadmium sulphide/selenide pigment which is protected by the inclusion of the pigment in zirconium silicate and an additive which is selected from the group consisting of antimony trioxide, ceric oxide, a mixture thereof and precursors therefor in an amount sufficient to reduce or prevent glaze defects.

* * * * *